United States Patent

Rogers

[15] 3,635,681
[45] Jan. 18, 1972

[54] DIFFERENTIAL CONDUCTIVITY-MEASURING APPARATUS

[72] Inventor: Robert Wayne Rogers, Elkhart, Ind.
[73] Assignee: Miles Laboratories, Inc., Elkhart, Ind.
[22] Filed: Nov. 13, 1969
[21] Appl. No.: 876,350

[52] U.S. Cl. ..........................23/253 R, 195/103.5, 204/195
[51] Int. Cl. ....................B01k 3/00, C12k 1/10, G01n 31/14
[58] Field of Search .............23/253; 195/103.5; 204/195 R, 204/195 P

[56] References Cited

UNITED STATES PATENTS 1,951,035  3/1934  Parker..........................204/195 R X

FOREIGN PATENTS OR APPLICATIONS 1,054,626  1/1967  Great Britain......................324/30 B

OTHER PUBLICATIONS

Clark et al., Annals New York Academy of Sciences, Vol. 102, Article 1, Pages 29–45, Oct. 31, 1962, Page 40 relied on.

Primary Examiner—Morris O. Wolk
Assistant Examiner—R. M. Reese
Attorney—Joseph C. Schwalbach, Michael A. Kondzella, Louis E. Davidson and Harry T. Stephenson

[57] ABSTRACT

Apparatus for measuring the change and rate of change in electrical conductivity in a test system due to a chemical reaction between a substance to be detected and a test reagent, as, for example, in an enzyme-substrate reaction, said apparatus including a pair of probes each of which has a pair of electrodes, the electrodes of one of said probes having the test reagent associated therewith by matrix means, preferably in fixed form, such that when said probes are placed in contact with an ionic medium containing the substance to be detected, the conductivity between the electrodes is dependent upon the conductivity of the matrix means and/or said ionic medium, and conductivity-measuring circuit means connected to both probes which electronically subtracts the background conductivity caused by the ionic medium and provides a differential measurement of the change and rate of change in conductivity caused by the reaction of the substance to be detected with the test reagent and thereby provides a measurement of the concentration of the substance to be detected in the ionic medium.

8 Claims, 5 Drawing Figures

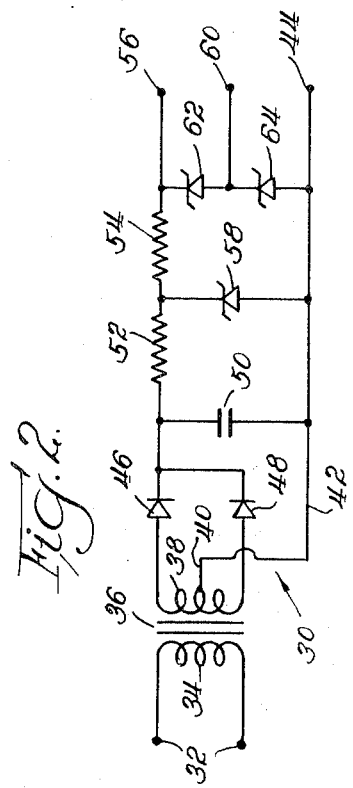
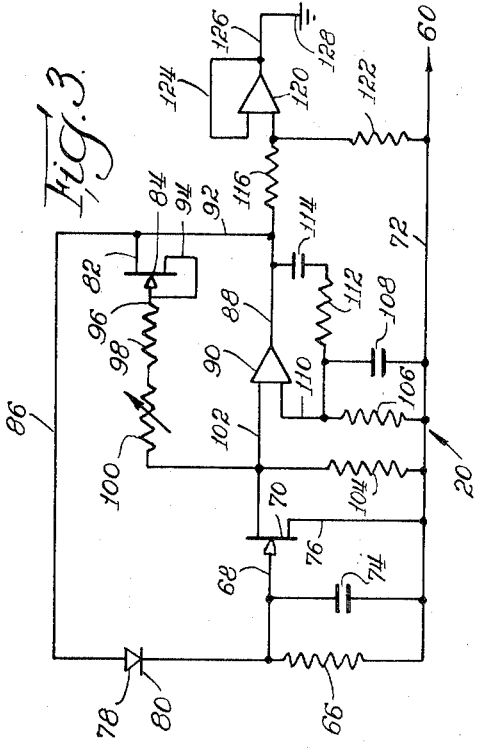
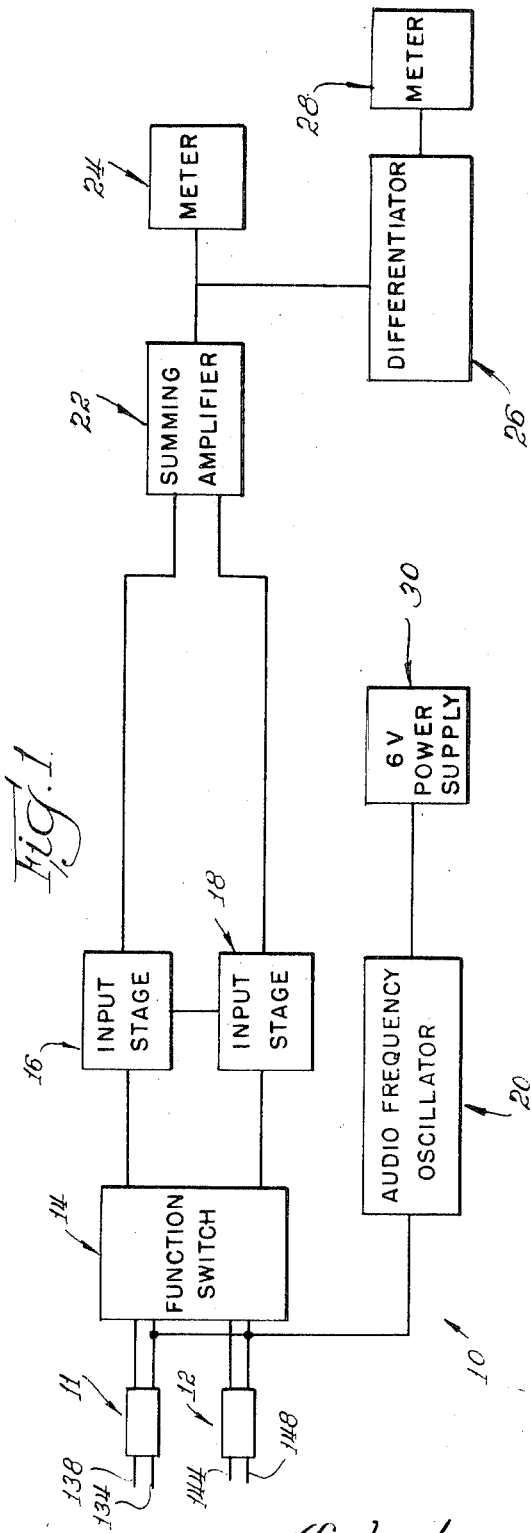
Inventor
Robert Wayne Rogers
By Harry T. Stephenson
Atty.

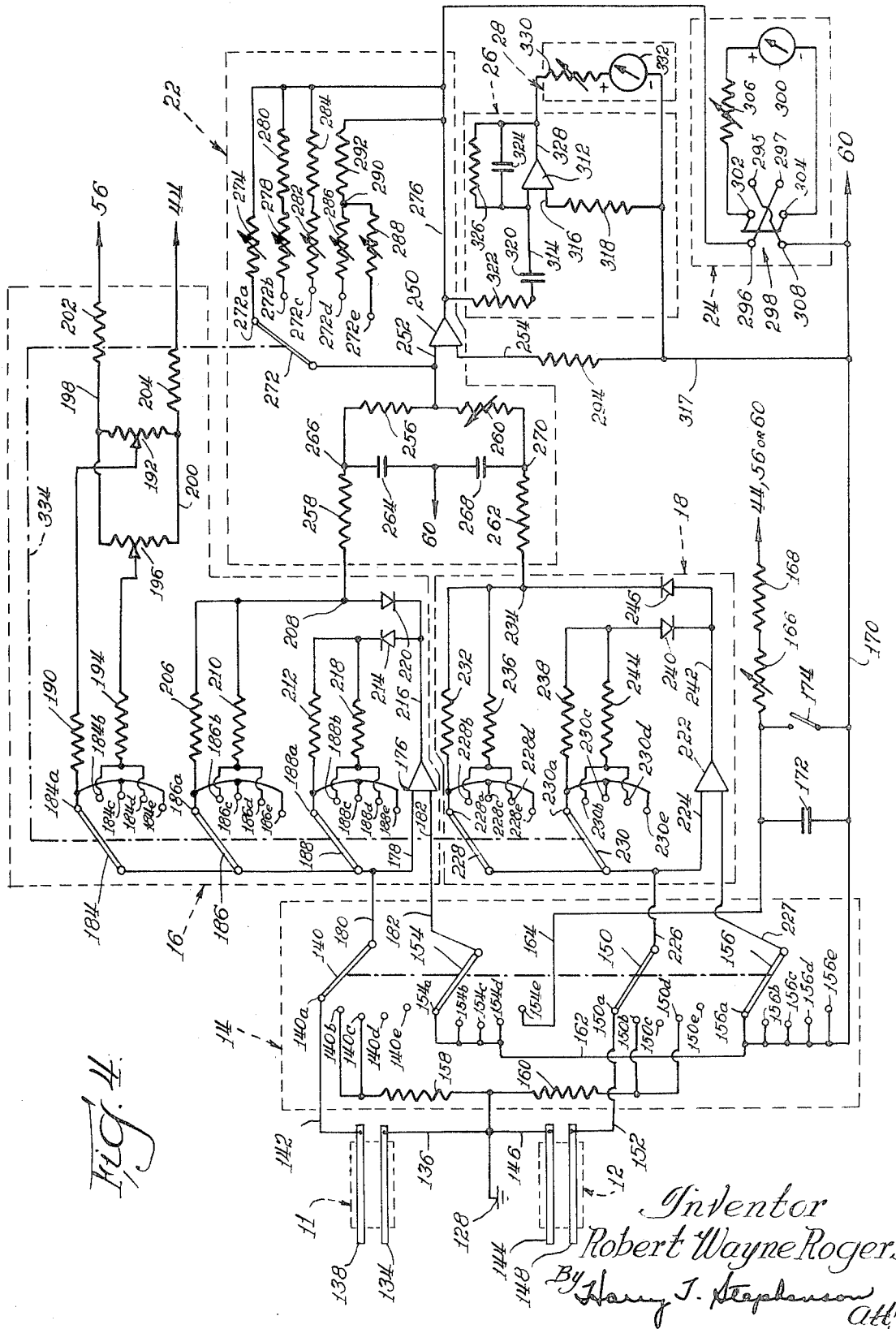

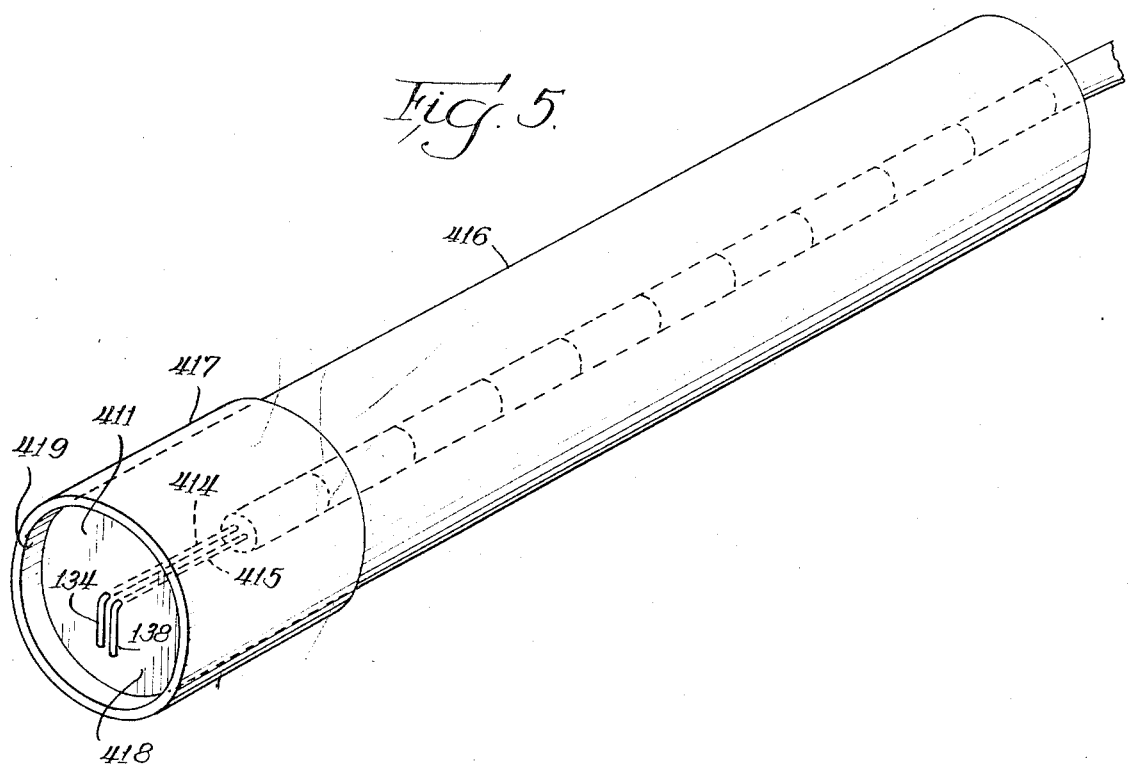

DIFFERENTIAL CONDUCTIVITY-MEASURING APPARATUS

BACKGROUND OF THE INVENTION

The present invention relates to differential conductivity-measuring apparatus, and more particularly, but not limited to apparatus for continuously measuring the change and rate of change of conductivity in a test system during a chemical reaction between a substance to be detected and a test reagent. The apparatus may also be used to measure the progress of a chemical reaction in a chemical process system.

As used herein, the following terms and definitions apply: ionic medium is any fluid, solution, suspension, emulsion, gel, solid or other system or combination thereof containing ionic species and which is capable of conducting an electrical current; the substance to be detected is a chemical material contained in the ionic medium and which is being estimated or monitored; the test reagent is a chemical compound or combination of chemical compounds which when contacted with the substance to be detected causes a change in conductivity in the system; matrix means is a gel or other chemical or physical means used to fix, immobilize or contain the test reagent in the desired relationship between the ionic medium and the electrodes used to measure conductivity; test system is the total combination of ionic medium, the substance to be detected, test reagent and matrix means; electrode is defined as an individual highly electrically conductive means having a definite physical shape and when spaced from another electrode enables the obtention of conductivity data therebetween; and, probe is defined as a physical assemblage of a pair of spaced electrodes and any matrix means associated therewith, which matrix means may also incorporate a test reagent.

Techniques for making quantitative chemical determinations and estimations through measurement of the change in conductivity of a test system before and after reaction of the substance to be detected with a test reagent are generally known. For example, one method or the quantitative determination of an enzyme or substrate which involves the measurement of the change in electrical conductivity of the test system resulting from interreaction of the enzyme and substrate is described in an article entitled "Conductivity Method for Determination of Urea" by W. T. Chin et al., published in Analytical Chemistry, Nov. 1961, at pp. 1,757–1,760. This method measures the electrical conductivity in a test fluid containing urea before and after reaction with urease and thereafter requires calculation of the change in conductivity. Another method for analytically studying either of the elements of an enzyme-substrate reaction wherein the test fluid has a different conductivity upon the addition of a test reagent is disclosed in U.S. Pat. No. 3,421,982. The latter method and apparatus exhibit certain disadvantages which the subject invention has substantially overcome. In particular, the apparatus disclosed in U.S. Pat. No. 3,421,982 includes circuitry which requires continuous manual adjustment to obtain a measurement of the change in conductivity; moreover, the method is based on the assumption that the reaction produces a linear rate of change of conductivity.

The present invention provides a differential conductivity-measuring apparatus which is a substantial improvement over the known apparatus and techniques for measuring the change and rate of change in conductivity in a test system wherein a substance to be detected and a test reagent interreact.

SUMMARY OF THE INVENTION

One of the primary objects of the present invention is to provide a novel method and apparatus for measuring the change and rate of change in electrical conductivity in a test system during a chemical reaction between a substance to be detected and a test reagent.

Another object of the present invention is to provide an apparatus of the class described which is adapted to subtract the background conductivity of an ionic medium containing the substance to be detected from the measured change in conductivity caused by a chemical reaction between a test reagent and a substance to be detected.

Another object of the present invention is to provide a method and apparatus as described which automatically and continuously balances out or subtracts the background conductivity of an ionic medium from the measured change in conductivity in a test system during a chemical reaction between a test reagent and a substance to be detected.

Another object of the present invention is to provide a measuring apparatus as described, which includes means for continuously measuring the rate of change in conductivity in a test system during a chemical reaction between a test reagent and a substance to be detected.

In carrying out the above objects of the present invention, a measuring instrument is usually employed which comprises a pair of probes, each of which includes a pair of spaced electrodes. The electrodes of the first probe are in intimate contact with a test reagent, such as an enzyme, incorporated with a matrix means. The electrodes of the second probe are preferably also in intimate contact with a matrix means, although such means need not necessarily be employed; however, such electrodes are not incorporated with the test reagent. In use, the first and second probes are contacted with an ionic medium containing the substance to be detected. The conductivity measured by the second probe is dependent upon the conductivity of the matrix means associated with the electrodes of said probe and of the ionic medium and the conductivity of the first probe is dependent upon the conductivity of the ionic medium and of the matrix means associated with electrodes of the first probe, as well as upon any change in conductivity produced by a chemical reaction between the test reagent and the substance to be detected. The apparatus includes circuit means comprising positive and negative DC input stages, an oscillator circuit, a summing amplifier circuit, a differentiator circuit, and meter circuits, said circuit means being coupled to the probes and adapted to subtract out the background conductivity of the ionic medium contacted by the probes and to measure the change and rate of change in conductivity of the test system.

Further objects and advantages of the invention, together with the organization and manner of operation thereof, may best be understood by reference to the following description taken in conjunction with the accompanying drawings, in the several figures of which like reference numerals identify like elements.

BRIEF DESCRIPTION OF THE DRAWINGS

FIG. 1 is a block diagram of the measuring apparatus in accordance with a preferred embodiment of the present invention;

FIG. 2 is a circuit diagram of the power supply for the measuring apparatus of FIG. 1;

FIG. 3 is a circuit diagram showing the audiofrequency oscillator circuit for the measuring apparatus illustrated in the block diagram of FIG. 1;

FIG. 4 is a circuit diagram showing the measuring circuit used in conjunction with the power supply and oscillator circuits of FIGS. 2 and 3, respectively; and FIG. 5 is a perspective view of one form of probe which may be used with the circuitry of the present invention.

DESCRIPTION OF A PREFERRED EMBODIMENT

Referring now to the drawings, and in particular to FIG. 1, a differential conductivity-measuring apparatus in accordance with a preferred embodiment of the invention is shown in block diagram form and indicated generally by reference numeral 10. The apparatus 10 includes probes 11 and 12 each comprising a pair of electrodes each of which is connected through a function switch, indicated at 14, to an associated input stage circuit 16 or 18, respectively. The function switch 14 selects the mode of operation of apparatus 10 as will be more fully described hereinbelow. An oscillator circuit 20 is connected to the input stage circuits 16 and 18, the outputs of the input stage circuits being connected to a summing amplifier circuit. The output of the summing amplifier circuit 22 is connected to a meter circuit 24 for reading the change in conductivity between the electrodes of a selected probe. The output from the summing amplifier circuit is also connected to a differentiator circuit 26, the output of which is connected to a meter circuit 28 for indicating the rate of change of conductivity between the electrodes of a selected probe. A DC power supply, indicated generally at 30, uses 110 v. line voltage and provides ±6 v. signals to the circuit in a manner described more fully below.

With reference to FIG. 2, the power supply 30 has terminals 32 for connection of a conventional source of alternating current, such as a 115 v., 60 cycle, across the primary 34 of a transformer 36. The secondary 38 of the transformer 36 is centertapped at 40, the tap being connected through a conductor 42 to a terminal 44. One side of the secondary 38 of transformer 36 is connected through a diode 46 to a resistor 52. The other side of the secondary 38 of transformer 36 is connected through a diode 48 to the junction of diode 46 and resistor 52. A capacitor 50 is connected between the junction of diode 46 and resistor 52 to the terminal 44 of the power supply through conductor 42. The resistor 52 is connected through a resistor 54 to a terminal 56. A zener diode 58 is connected between the junction of resistors 52, 54 and the conductor 42. A pair of zener diodes 62 and 64 are connected in series across the output terminals 56 and 44, and the junction of diodes 62 and 64 is connected to a terminal 60. The power supply 30 provides 12 v. DC between terminals 56 and 44, while providing ±6 v. DC between the terminal 60 and either of terminals 44 and 56.

Referring to FIG. 3, the oscillator circuit 20 comprises a field-effect transistor-regulated phase-shift oscillator and buffer amplifier which supplies a sinusoidal voltage regulated to 0.1 v. peak-to-peak amplitude. The oscillator circuit 20 includes a resistor 66 connected to the gate 68 of a field-effect transistor 70 and to the terminal 60 of the power source 30 through a conductor 72. A capacitor 74 is connected from the gate 68 of transistor 70 to the conductor 72. The source 76 of transistor 70 is also connected to the conductor 72. A diode 78 has its cathode 80 connected to the gate 68 of the field-effect transistor 70 and has its anode connected to the drain 82 of a transistor 84 through a conductor 86. The anode of diode 78 is also connected to the output lead 88 of an amplifier 90 through a conductor 92. The source 94 and gate 96 of transistor 84 are connected through a resistor 98 and a variable resistor 100 to the negative input 102 of the amplifier 90 and the drain of transistor 70, which, in turn, are connected to conductor 72 through resistor 104.

A resistor 106 and a capacitor 108 are connected in parallel to form a parallel resonant circuit. The parallel resonant circuit is connected from the conductor 72 to the positive input 110 of the amplifier 90. A resistor 112 and a capacitor 114 are connected in series between the positive input 110 of amplifier 90 and the output lead 88 thereof and form a series resonant circuit. The resistors 106 and 112, and capacitors 108 and 114 determine the frequency, which is 3 kHz. in the preferred embodiment of the oscillator circuit. A resistor 116 is connected between the output 88 of amplifier 90 and the positive input of an amplifier 120, the positive input being connected to the conductor 72 through a resistor 122. A conductor 124 connects the negative input of the amplifier 120 to the output 126 therefor and to the case ground 128 of the measuring instrument.

Referring now to FIG. 4, the sensor means comprises first and second probes 11 and 12 comprising pairs of electrodes 134 and 138 and 144 and 148, respectively. The probe 11 will be referred to hereinafter as the input measuring probe and the probe 12 will be referred to as the reference or background conductivity measuring probe. The probes 11 and 12 are constructed in such a way that the electrodes thereof extend beyond the end of the body thereof in spaced relation and can be caused to intimately contact a conducting ionic medium. Thus, impression of an electrical voltage across the pairs of electrodes will cause current flow between the electrodes dependent upon the conductivity of the ionic medium and any matrix means providing a conducting path between the spaced electrodes. While the probes 11 and 12 may be of generally known construction, a probe construction found particularly useful in carrying out the present invention is disclosed in copending application Ser. No. 30,329, filed Apr. 20, 1970 which is a continuation-in-part of application Ser. No. 835,658, filed June 23, 1969 and now abandoned. The construction and use of such probes is described more fully hereinafter.

The electrode 134 of input measuring probe 12 is connected to the instrument case ground 128 through a conductor 136. The other electrode 138 of the probe 12 is connected through a conductor 142 to a fixed contact 140a of a five-position switch 140 in the function switch 14. In similar fashion, electrode 144 of the reference probe 12 is connected to the case ground 128 through a conductor 146, the other electrode 148 of the reference probe 12 being connected through a conductor 152 to a fixed contact 150a of a five-position switch 150 in the function switch 14.

In addition to the five-position switches 140 and 150, the function switch 14 includes five-position switches 154 and 156. The movable conductor arms of switches 140, 150, 154 and 156 are mechanically linked for simultaneous movement in a conventional manner such as in a switch commercially available under the trade name Centralab PA 1013. Each of the movable conductor arms of switches 140, 150, 154 and 156 has five fixed contacts associated therewith; the switch arm 140 having contacts 140 a to e associated therewith, the contact 150 having contacts 150 a to e associated therewith, the switch arm 154 having contacts 154 a to e associated therewith, and the switch arm 156 having contacts 150 a to e associated therewith. The five positions of the switches 140, 150, 154 and 156 correspond to "operate," "balance," "oscillator adjust up scale," "oscillator adjust down scale" and "rate calibration," when considered as the switch arms are moved through positions engaging the associated contacts a to e, respectively.

The function switch 14 also includes an internal calibration resistor 158 connected from the case ground 128 to contacts 140b and 140c of the switch 140. A second internal calibration resistor 160 is connected between the case ground 128 and contacts 150b and 150d of the switch 150. The switch contacts 154 a to d of switch 154 are connected through a conductor 162 to the contacts 156 a to e of switch 156. A conductor 164 is adapted to connect the contact 154e of switch 154 to either of the power source terminals 44, 56 or 60 through a rate calibration control variable resistor 166 and a resistor 168 connected in series therewith. A conductor 170 connects the contacts 156 a to e of switch 156 to the terminal 60 of the power supply 30. A rate calibration capacitor 172 and a normally closed rate calibration switch 174 are connected in parallel between the conductors 164 and 170 as shown. Switch 174 is opened, as shown, for rate calibration.

The input stage circuit 16 includes an operational amplifier 176, such as a solid-state amplifier, operating as an inverting amplifier and having rectifiers in the feedback circuit to convert the output of the amplifier to a positive DC voltage proportional to the input current. The amplifier 176 has a negative input conductor 178 connected to the movable arm of switch 140 of function switch 14 through a conductor 180. The positive input 182 of amplifier 176 is connected to the arm of switch 154 of the function switch 14. The negative input conductor 178 of the amplifier 176 is connected to the movable conductor arms of three mechanically connected five-position switches 184, 186 and 188, each of which comprises a movable conductor arm and five fixed terminal contacts; the arm of switch 184 being associated with fixed contacts 184 a to e, the arm of switch arm 186 being associated with fixed terminal contacts 186 *a* to *e*., and the arm of switch 188 being associated with fixed contact terminals 188 *a* to *e*.

The terminal contacts 184*a*, 184*c* and 184*e* of switch 184 are connected through a resistor 190 to the movable contact of a potentiometer 192. The terminal contacts 184*b* and 184*d* are connected through a resistor 194 to the movable contact of a zero control potentiometer 196. The control potentiometers 192 and 196 are connected in parallel across conductors 198 and 200 which in turn are connected, respectively, to the output terminals 56 and 44 of the power supply 10 through resistors 202 and 204, respectively. The switch 184 and potentiometers 192 and 196 provide means for selecting the desired sensitivity of the differential conductivity-measuring apparatus 10 and also provide DC balance or zero controls for balancing the operational amplifier 176.

The fixed terminal contacts 186*a*, 186*c*, and 186*e* are connected through a resistor 206 to an output terminal 208 of the input stage circuit 16. The terminal contacts 186*b* and 186*d* are connected to the output terminal 208 through a resistor 210. The terminal contacts 188*a*, 188*c* and 188*e* are connected through a resistor 212 to the cathode of a diode 214, the anode of which is connected to the output 216 of amplifier 176. The terminal contacts 188*b* and 188*d* are connected through a resistor 218 to the cathode of diode 214. A diode 220 has its cathode connected to the output 216 of amplifier 176 and its anode connected to the output terminal 208.

The input stage circuit 18 includes an operational amplifier 222 operating as an inverting amplifier and having rectifiers in the feedback circuit to convert its output to a negative DC voltage proportional to the input current. The amplifier 222 has a negative input 224 connected to the movable contact arm of switch 150 of function switch 14 through a conductor 226. A positive input 227 of the amplifier 222 is connected to the movable contact arm of switch 156 of the function switch 14. The input stage circuit 18 includes two five-position switches 228 and 230 which are mechanically coupled for simultaneous movement with the above-described switches 184, 186 and 188 of the input stage circuit 16.

The five-position switch 228 includes a movable contact arm and fixed terminal contacts 228 *a* to *e*, and the five-position switch 230 includes a movable contact arm and five terminal contacts 230 *a* to *e*. The contacts 228*a*, 228*c* and 228*e* are connected through a resistor 232 to an output terminal 234 of the input stage circuit 18. The contacts 228*b* and 228*d* are connected to the output terminal contact 234 through a resistor 236. The contacts 230*a*, 230*c* and 230*e* are connected through a resistor 238 to the anode of a diode 240 which has its cathode connected to the output 242 of the amplifier 222. The contacts 230*b* and 230*d* are connected to the anode of diode 240 through a resistor 244. A diode 246 has its anode connected to the amplifier output 242 and its cathode connected to the output terminal 234.

The summing amplifier circuit 22 serves to combine the outputs from the input stage circuits 16 and 18 and, as will become more apparent hereinbelow, includes a switch 272 for selecting the desired sensitivity and means for balancing the outputs from the input stage circuits to compensate for electrode differences. Switch 272 is mechanically coupled for simultaneous movement with switches 184, 186, 188, 228 and 230 to form therewith a range switch 334. The summing amplifier circuit 22 includes an amplifier 250 having a negative input 252 and a positive input 254. The negative input 252 of the amplifier 250 is connected to the output terminal 208 of the input stage circuit 16 through series-connected resistors 256 and 258. The negative input 252 of the amplifier 250 is also connected to output terminal 234 of the input stage circuit 18 through a balance control variable resistor 260 connected in series with a resistor 262. A capacitor 264 is connected between the terminal 60 of the power supply 30 and a terminal 266 between the series-connected resistors 256 and 258. A similar capacitor 268 is connected between the terminal 60 of the power supply 30 and a terminal 270 between the series-connected variable resistor 260 and resistor 262.

The balance control variable resistor 260 provides a means for balancing the output from the input stage circuits 16 and 18 to compensate for electrode differences.

The summing amplifier circuit 22 also includes a plurality of feedback resistors and a range switch 272 having a contact arm movable to contact any one of five fixed terminals 272 *a* to *e* for selecting one of the five feedback resistors. The movable contact arm of switch 272 is connected to the negative input 252 of the amplifier 250. The fixed terminal 272*a* is connected through a variable resistor 274 to the output 276 of the amplifier 250. The fixed contact 272*b* is connected through a variable resistor 278, having a value less than the variable resistor 274, and a resistor 280 to the output 276 of the amplifier 250. The contact 272*c* is connected through a variable resistor 282, having a range intermediate that of variable resistors 274 and 278, and a resistor 284 to the output 276 of the amplifier 250. The switch contacts 272*d* and 272*e* are connected through variable resistors 286 and 288, respectively, having ranges different than the ranges of scale resistors 274, 278 and 272, to a terminal 290 which, in turn, is connected through a resistor 292 to the output 276 of the amplifier 250. The positive input 254 of the amplifier 250 is connected through a resistor 294 to the terminal 60 of the power supply 30.

The output 276 of the amplifier 250 is connected to a terminal 296 of a meter-reversing switch 298 in the meter circuit 24. The meter circuit 24 is adapted to read the output from the summing amplifier circuit 22 as differential conductivity. To this end, the meter circuit 24 includes a linear scale meter 300 such as a microammeter or other suitable device connected in circuit with terminals 302 and 304 of the reversing switch 298. A scale calibration variable resistor 306 is connected between the terminal 302 of the reversing switch 298 and the positive terminal of meter 300 and provides a sensitivity control for circuit calibration. Terminals 295 and 297 are connected to terminals 308 and 296 respectively of reversing switch 298. A terminal 308 of the reversing switch 298 is connected to the terminal 60 of the power supply circuit 30.

A differentiating circuit 26 connected to the summing amplifier circuit 22 is adapted to differentiate the output from the summing amplifier 250. The differentiator circuit 26 includes an operational amplifier 312 having a negative input 314 and a positive input 316. The positive input 316 is connected through a resistor 318 and conductor 317 to the output terminal 60 of the power supply circuit 30. The negative input 314 of amplifier 312 is connected through a series-connected capacitor 320 and a resistor 322 to the output 276 of the amplifier 250 in the summing amplifier circuit 22. Capacitor 320 and resistor 322 serve as a low pass filter to exclude unwanted frequencies from the differentiator-connected amplifier 312. A feedback circuit including a parallel-connected capacitor 324 and a resistor 326 are connected between the output 328 and negative input 314 of the amplifier 312 to provide the time constant for the integrator.

The output 328 of the differentiator circuit amplifier 312 is connected through a scale calibration variable resistor 330 to the positive terminal of a meter 332, such as a microammeter or other suitable device, the negative terminal of which is connected to the output terminal 60 of the power supply circuit 30 through the conductor 317. The variable resistor 330 serves as a calibration control for the meter 332 which provides a reading of the output of the differentiator circuit 26 as a rate of change of conductivity during measuring.

FIG. 5 illustrates a form of probe construction which may be utilized in probes 11 and 12 in FIGS. 1 and 4. A flat circular disc 411 of plexiglass one-half inch in diameter has two holes found in the center portion thereof, and the terminal portions of two 22 gauge platinum wires 134 and 138 project therethrough. The terminal portions of wires 134 and 138 are bent to overlay the surface of disc 411 and are parallel, 1 centimeter in length and spaced 2 millimeters apart. Lead wires 414 and 415 are attached to platinum wires 134 and 138, and extend axially through a centrally bored ½-inch by 6-inch polystyrene handle 416 which is cemented at one end to the plexiglass disc 411 in coaxial relation thereto. A tygon sleeve 417 is fitted telescopically over the handle 416 and projects axially beyond the outer surface of the disc 411 to provide a cavity defined by inside wall 419 of the tip of tygon sleeve 417 for containing and mechanically supporting a disclike layer of matrix means 418. Such matrix means 418 may comprise a polymeric semipermeable membrane. In the case of input measuring probe 11 the matrix means 418 preferably contains a test reagent, such as an enzyme; and in the case of reference probe 12 the matrix means 418 need not contain a test reagent.

OPERATION

In using the apparatus described hereinbefore, the electrodes of the probes 11 and 12 are contacted with an ionic medium, for example the fluid to be tested. The oscillator supplies a voltage to the probes 11 and 12. The input stages 16 and 18 sense the current flow across the electrodes of the probes 11 and 12 and supply DC voltage of opposite polarities to the summing amplifier 22 such voltages being proportional to the conductivity at the electrodes of the respective probes 11 and 12. The summing amplifier 22 supplies an output current which is proportional to the difference in conductivity at the electrodes of the probes 11 and 12, said current being measured by the meter circuit 24, and the differential conductivity is indicated thereby in micromhos.

The output current of the summing amplifier 22 is fed into the differentiator circuit 26 which senses the rate of any change in the output current of the summing amplifier circuit 22 and supplies a current to the meter circuit 28 which is proportional to and indicates the direction of any such change. The meter circuit 28 indicates the change in conductivity in micromhos per second.

What is claimed is:

1. Apparatus for measuring the change in electrical conductivity in a test system due to a chemical reaction between a test reagent and a substance to be detected contained in an ionic medium comprising, in combination, sensor means including first and second probes each having a pair of electrodes contacting said ionic medium, the electrodes of said first probe having said test reagent incorporated therewith by matrix means, and circuit means connected to both of said probes and operable to differentially measure the change in conductivity of said probes resulting from a chemical reaction between said test reagent and the substance to be detected when said probes are in contact with an ionic medium containing said substance.

2. Apparatus as defined in claim 1 wherein said circuit means includes means for subtracting the conductivity sensed by said second probe from the conductivity sensed by said first probe.

3. Apparatus as defined in claim 1 wherein said circuit means continuously subtracts the conductivity sensed by said second probe from the conductivity sensed by said first probe during said chemical reaction, thereby affording a measurement of the rate of change of said differential conductivity during said reaction.

4. Apparatus as in claim 1 wherein said test reagent is incorporated in said matrix means and said matrix means is placed in intimate contact with the electrodes of the first probe.

5. Apparatus as in claim 4 wherein said matrix means comprises a polymeric semipermeable membrane.

6. Apparatus as in claim 1 wherein the electrodes of said second probe are also in intimate contact with a matrix means.

7. Apparatus as in claim 1 wherein said circuit means comprises an oscillator connected to an electrode of each probe for supplying electrical power thereto, a first input circuit connected to the other electrode of said first probe and having a positive DC voltage output, a second input stage circuit connected to the other electrode of said second probe and having a negative DC voltage output, a summing amplifier connected to and operable to combine the output of said input stages, a meter connected to said summing amplifier and affording an indication of differential conductivity at said probes.

8. Apparatus as in claim 7 wherein said circuit means also includes a differentiating circuit connected to said summing amplifier and operable to measure the rate of change of the differential conductivity at the probes, and a meter connected to said differentiating circuit and affording an indication of said rate of change of conductivity.

* * * * *